United States Patent Office 2,886,145
Patented May 12, 1959

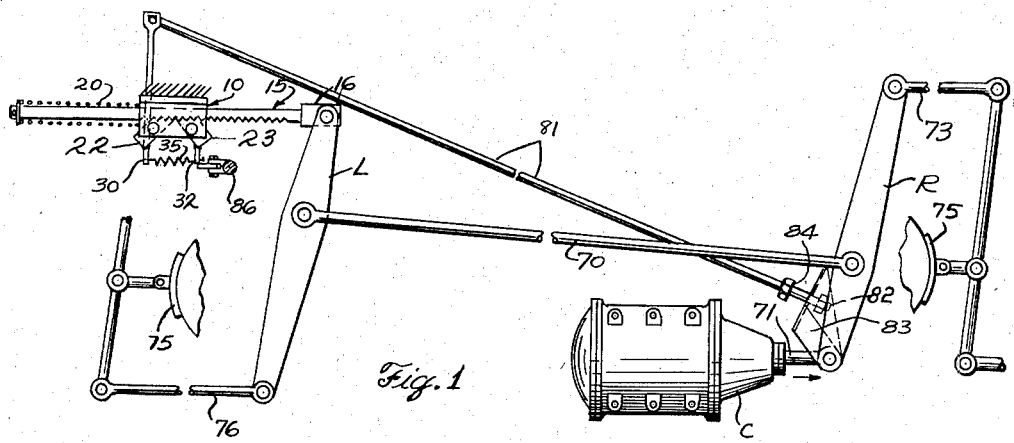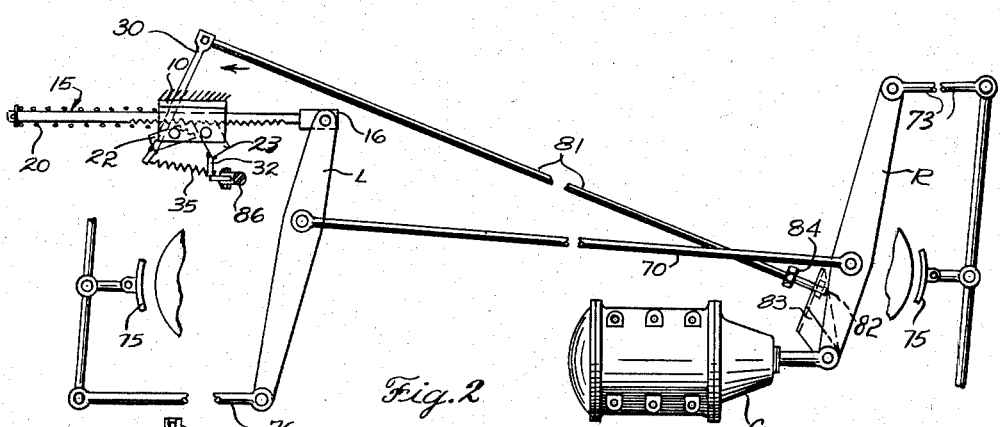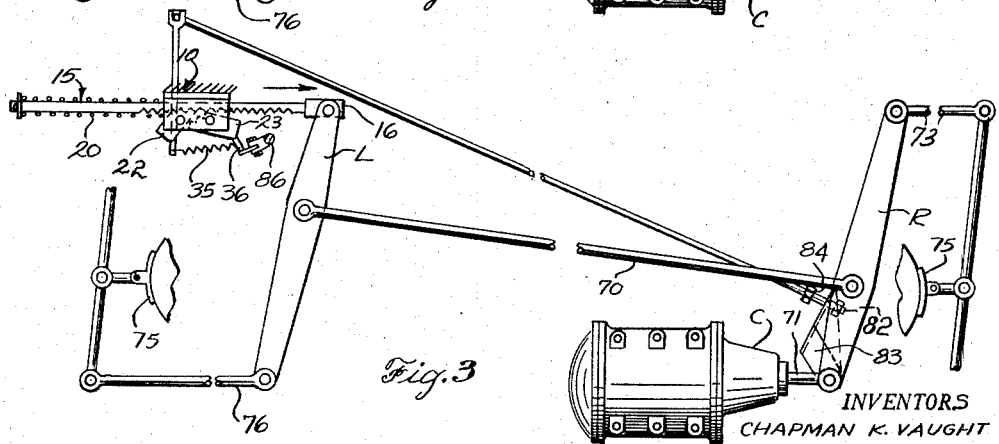

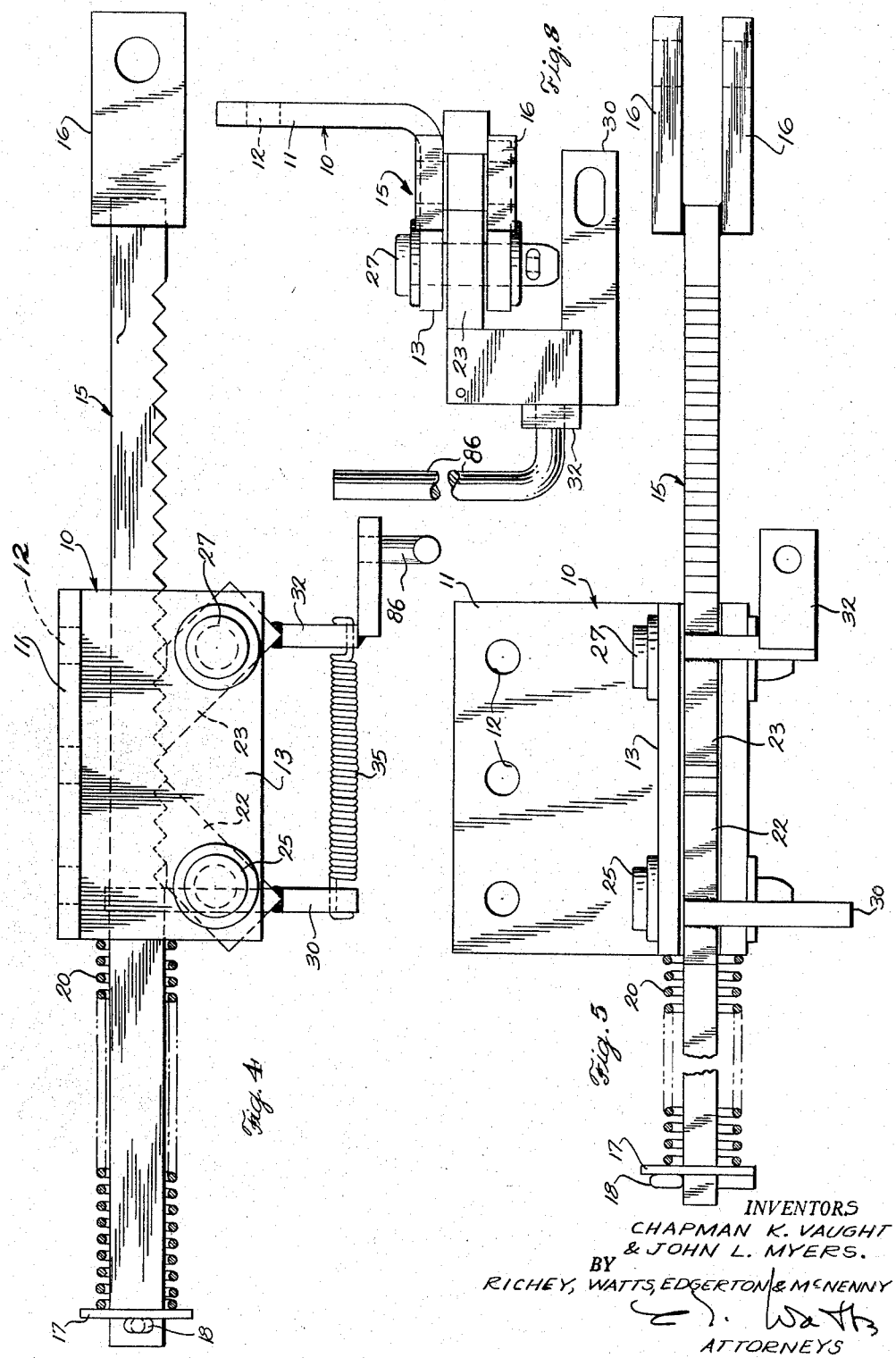

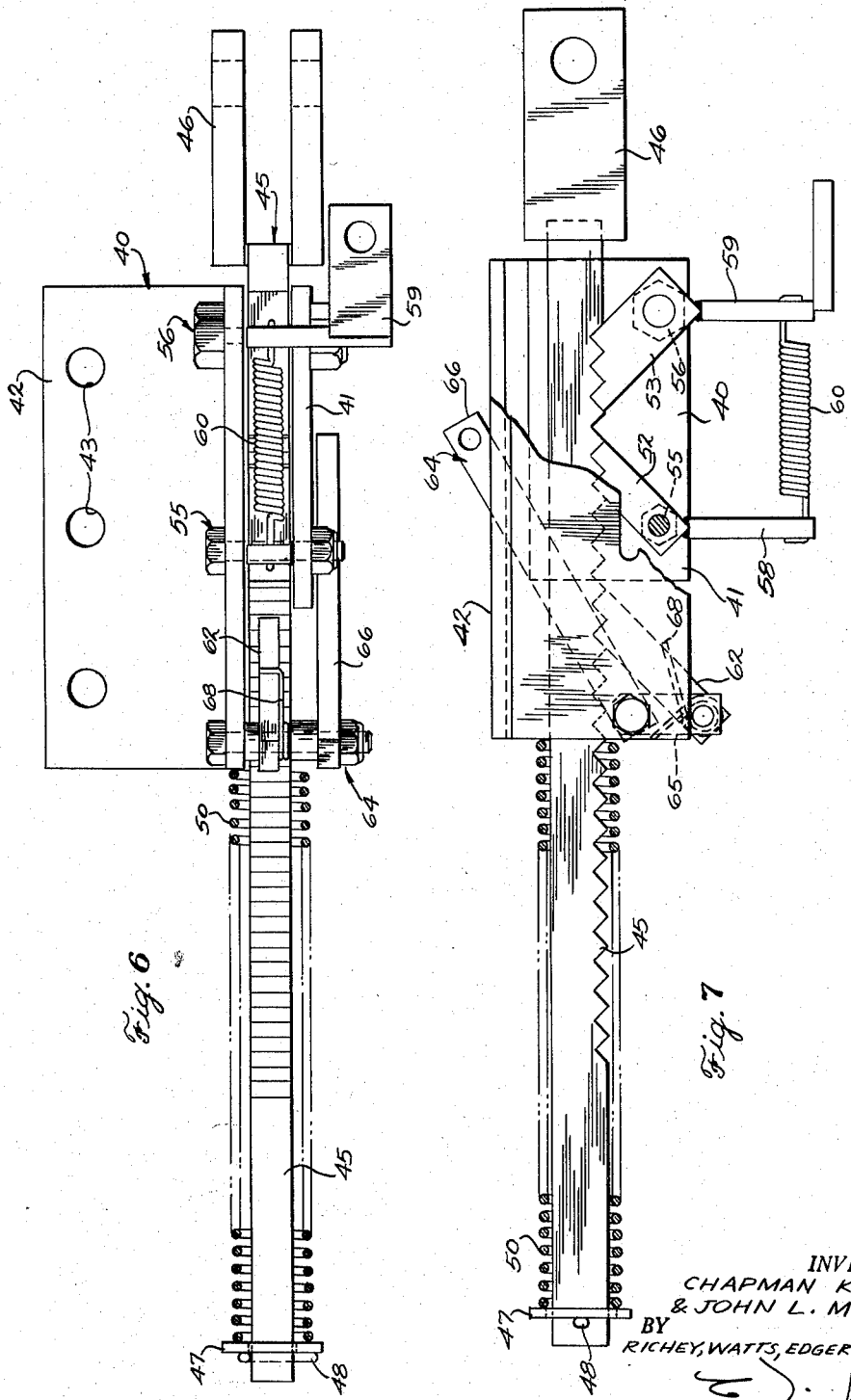

2,886,145

AUTOMATIC BRAKE SLACK ADJUSTER

Chapman K. Vaught and John L. Myers, Warren, Ohio, assignors to The American Welding and Manufacturing Company, Warren, Ohio, a corporation of Ohio Application May 2, 1956, Serial No. 582,115

5 Claims. (Cl. 188—200)

The present invention relates generally to railway brake systems and is more particularly concerned with a novel automatic brake slack adjuster and with a new railway car braking system, including said automatic brake slack adjuster.

There have been a large number of devices invented and developed in the railway brake field and through extensive tests and use, the best of these inventions and developments have evolved into the modern convention, railway brake systems, including means for adjusting slack in the brakes as the brake shoes are worn in use. Nevertheless, there are difficulties and shortcomings in the installation, operation and maintenance of this standard equipment which persisted all through its development and refinement down to the present time. A principal dereliction of these devices is their slow response to and correction of sudden development of sizable and dangerous slack. Another disadvantageous feature is the timing of the slack adjustment relative to the application of the brakes in these systems which necessitates at least one complete braking operation before the brakes can be fully effective.

In accordance with the present invention, a slack adjuster which is comparatively inexpensive and which is readily adaptable to all conventional railway brake rigging arrangements is provided. In addition, the device of this invention operates to take up through one actuation, rather than step-wise, all the slack in the system and to make that adjustment prior to the time that the brakes shoes are engaged with the wheels. Still further, the device of this invention offers the advantage of instantaneous reset and in one form, provides in addition, means for manual reset.

Generally described, an automatic brake slack adjuster of this invention comprises a rack which has an end portion for connection to a brake lever to serve as a fulcrum for a railway car brake system. In addition, a bracket is provided for rigid attachment to the car to carry the rack for endwise motion relative to the bracket. Spring means is associated with the rack and bracket to resiliently urge movement of the rack to shift the fulcrum end portion thereof relative to the bracket. A first pawl is pivotally carried by the bracket and engages the rack to prevent endwise motion of the rack on one direction relative to the bracket. A second pawl is pivotally carried by the bracket and engages the rack to prevent motion of the rack relative to the bracket in the other direction. Finally, means are provided to resiliently oppose disengagement of the first and second pawls with the rack.

In its combination aspect, the present invention comprises in general, an automatic brake slack adjuster having an end portion for connection to one of the brake levers of a railway car brake system to serve as a fulcrum for that system. As described above, this slack adjuster includes a bracket carrying a rack and anchoring the brake system and it also includes means resiliently urging movement of the rack relative to the bracket to shift the fulcrum and take up slack in the system. This combination device further includes cocking means operatively associated with the rack and said resilient means, and trigger means to release the cocking means. Finally, the combination includes means carried by the piston rod of a brake cylinder to actuate the trigger means when slack is to be taken up in the brake system.

Those skilled in the art will gain a better and further understanding of this invention and the new and important results and advantages thereof upon consideration of the following detailed description of two embodiments of the invention, reference being had to the drawings accompanying and forming a part of this specification, in which:

Figure 1 is a fragmentary plan view of a railway car brake system embodying this invention and including a preferred form of slack adjuster of this invention;

Figure 2 is a view of the system of Figure 1, showing the slack adjuster in the act of taking up slack in the system;

Figure 3 is likewise similar to Figure 1, but illustrates the action involved in resetting the slack adjuster;

Figure 4 is an enlarged plan view of the slack adjuster shown in the system of Figure 1;

Figure 5 is a side-elevational view of the Figure 4 device;

Figure 6 is a side-elevational view of another form of the brake slack adjuster of this invention;

Figure 7 is a top plan view of the device of Figure 6; and

Figure 8 is an end view of the Figure 4 slack adjuster.

The slack adjuster illustrated in Figures 4 and 5 comprises a bracket 10 having an upstanding flange 11 for attachment to an underportion of a railway car, openings 12 being provided in flange 11 for the purposes of making this connection by bolt means or the like (not shown). In addition, bracket 10 has a bifurcated body portion 13 to receive in free, sliding engagement and endwise travel, an elongated rack 15.

Rack 15 has a clevis 16 at one end for attachment to a brake lever and has a spring-retaining ring 17 adjacent to its other end, a pin 18 being provided to hold ring 17 in place.

A compression spring 20 is arranged telescopically with the portion of rack 15 disposed between ring 17 and bracket 10. Thus, the rack is constantly resiliently urged in movement relative to bracket 10 to bring clevis 16 toward the bracket.

A pair of pawls 22 and 23 are disposed within body 13 of bracket 10 for engagement with rack 15 to prevent travel of the rack through the bracket in either direction. These pawls, accordingly, are opposed to each other and are independently effective either to prevent motion of the rack to take up slack in the system or motion of the rack in the other direction to reset the adjuster. Pawl 22 is pivotally mounted in the bracket by means of pin 25 which projects through registered openings in body 13 provided for that purpose. Pawl 23 is similarly movably mounted in bracket 10 by means of a pin 27.

Pawl 22 is operated by lever means 30 which is welded or otherwise suitably secured to the pawl whereby movement of the lever means will result in disengagement of the pawl with rack 15 as indicated in Figure 2. Pawl 23 is similarly provided with an operating lever 32 which is connected by a weld to the pawl so that movement of lever 32 will result in disengagement with pawl 23 with rack 15, as illustrated in Figure 3. Lever means 30 and 32 are connected together by means of a tension spring 35 so that the pawls are constantly resiliently urged against the rack to prevent inadvertent movement of the rack relative to the bracket.

The slack adjuster illustrated in Figures 6 and 7 is generally similar to that shown in Figures 4 and 5, but includes additional means to enable manual resetting of the device, as generally indicated above. Thus, this slack adjuster comprises a bracket 40 having a bifurcated body portion 41 and a flange portion 42 in which are provided three openings 43 to receive fastening means (not shown) for securing the bracket to an underportion of a railway car.

An elongated rack bar 45 is disposed with a portion extending through body 41 and has a clevis portion 46 at one end for connection to a brake lever whereby the rack and bracket serve as a fulcrum for the brake system and slack is taken up in the rigging by shifting the clevis or the fulcrum, as will be described more in detail in reference to the combination apparatus of this invention. At its other end, the rack is provided with a spring-retaining ring 47 and a pin 48 to hold ring 47 against displacement from the rack.

A compression spring 50 is disposed between ring 47 and the opposed portion of bracket 40 so as to resiliently urge endwise movement of the rack relative to the bracket to bring the fulcrum or clevis portion thereof adjacent to the bracket and thereby take up slack in the system.

A pair of opposed pawls 52 and 53 are pivotally mounted within body 41 for engagement with rack 45 to prevent its endwise movement relative to bracket 40 in either direction. Pawls 52 and 53 are secured movably in assembly with bracket 40 by bolt and nut means 55 and 56, pairs of registered openings being provided in body 41 for this purpose. Pawl 52 is equipped with an actuating lever 58 so that the pawl can be disengaged from rack 45 to permit endwise movement of the rack by action of spring 50. Pawl 53 is similarly provided with an actuating lever 59 which is welded or otherwise suitably secured to the pawl to enable operation of the pawl to disengage rack 45 and permit its endwise movement for resetting. Lever means 58 and 59 are resiliently connected together by a tension spring 60 which functions to resiliently oppose disengagement of the pawls with the rack.

A third pawl 62 is provided for manually resetting the rack, being carried by body 41 and located between pawl 52 and compression spring 50. Operating means for pawl 62 comprises a jack 64 including a relatively short lever 65 and a long lever 66 to provide a mechanical advantage enabling easy manual operation. Lever 65 and pawl 62 are resiliently urged toward registered relation with each other by means of a spring 68 which consequently maintains pawl 62 in engagement at all times with rack 45.

The novel combination apparatus of this invention, as illustrated in Figures 1 to 3, inclusive, comprises a brake cylinder C, a pair of brake levers L and R connected together by a rod 70. Piston rod 71 of cylinder C is connected to one end of lever R and the other end of that lever is operatively connected to a brake shoe 75 by a brake rod 73. Similarly, one end of lever L is operatively connected to another shoe 75 through linkage including a brake rod 76, while at its other end lever L is connected to clevis 16 of the slack adjuster of Figures 4 and 5.

In this combination apparatus, a cocking means is provided including a rack 15, compression spring 20 and pawl 22. Trigger means to release the cocking means includes lever 30 and trigger lever 81 connected to lever 30 and having an end portion 82 adjacent to cylinder C. Actuation of the trigger means is accomplished in the operation of this combination apparatus by means comprising a bracket 83 carried by piston rod 71 for engagement with an abutment 84 provided on trigger lever 81, as illustrated in Figure 2.

Rack 15, pawl 23 and cylinder C may be considered a second cocking means to be used for the purpose of resetting the slack adjuster. Likewise, lever 32 together with trigger lever 86 connected thereto may be considered as a second trigger means for the resetting operation. In this instance, however, trigger actuation is accomplished manually, preferably from the side of a car equipped with this combination apparatus, the operator moving trigger lever 86 to disengage pawl 23 from rack 15. By virtue of the fact that cylinder C can act to compress spring 20, rack 15 is moved to shift fulcrum clevis 16 away from bracket 10 when the said second trigger means is actuated to release pawl 23, as illustrated in Figure 3.

In the operation of the system of Figs. 1 to 3, inclusive, the brakes are applied by force delivered by cylinder C and as piston rod 71 moves to the right on the power stroke as viewed in these drawings, bracket 83 is carried with it and relative to trigger lever 81 along which the bracket slides. If there is slack in the system requiring take-up, the piston rod will travel relative to lever 81 far enough on the power stroke to bring bracket 83 into engagement with an abutment member 82 of lever 81 and thereby move the trigger lever from its normal position (Fig. 1) to the trigger release position shown in Fig. 2. Spring 20 then takes up all the slack by forcing rack 15 to the left as far as necessary to bring shoes 75 into engagement with the car wheels for braking effect under the power provided by cylinder C.

To reset the slack adjuster of this system, the brakes are applied in the usual manner by actuating cylinder C and while this condition prevails, trigger lever 86 is manually operated to disengage pawl 23 from rack 15. The rack then is drawn to the right against spring 20 as illustrated in Fig. 3. In accordance with preferred practice lever 86 will extend to a point adjacent to the side of the car so that the brakeman can operate it at a minimum of risk to himself.

From the foregoing description, it will be understood that the advantages set forth above are all readily obtainable in accordance with this invention. For example, it is seen that all the slack in the system is taken up in one bite when the trigger means is actuated, as shown in Figure 2. Furthermore, this slack take-up occurs virtually instantaneously on such actuation of the trigger and prior to the time that the brake shoes are applied to the wheels. It is also seen that resetting can be accomplished in one motion instead of step-wise and by means of cylinder C rather than manually, where such operation is desired. It is only necessary to operate the said second trigger means to release pawl 23 from rack 15 and then apply the brakes so that spring 20 is compressed to its original or starting condition through the action of cylinder C. On the other hand, where power for cylinder C is unavailable, as where a car equipped with this combination device of this invention is uncoupled from its locomotive resetting of the slack adjuster can be accomplished manually at substantial mechanical advantage to make the operation an easy one.

Having thus described our invention so that others skilled in the art may be able to understand and practice the same, we state that what we desire to secure by Letters Patent is defined in what is claimed.

What is claimed is:

1. An automatic brake slack adjuster for a railway car brake system including a brake cylinder having a piston rod which comprises a rack having an end portion for connection to a brake lever to serve as a fulcrum for the system, a bracket to be rigidly fastened to the car and carrying the rack for endwise motion relative to the bracket, spring means engaging the rack and bracket and resiliently urging movement of the rack to shift said fulcrum end portion relative to the bracket, a first pawl pivotally carried by the bracket and engaging the rack to prevent endwise motion of the rack in one direction relative to the bracket, a second pawl pivotally carried by the bracket and engaging the rack to prevent motion of the rack relative to the bracket in the other direction, resilient means resiliently opposing disengagement of said pawls with the rack, and means secured to the first pawl for connection to a brake cylinder piston rod to move the said first pawl against the force of the resilient means to disengage the first pawl from the rack.

2. An automatic brake slack adjuster for a railway car brake system including a brake cylinder having a piston rod which comprises a rack having an end portion for connection to a brake lever to serve as a fulcrum for the system, a bracket to be rigidly fastened to the car and carrying the rack for endwise motion relative to the bracket, a compression spring disposed between and engaging the rack and bracket and resiliently urging movement of the rack to bring said fulcrum end portion toward the bracket, a first pawl pivotally carried by the bracket and engaging the rack to prevent motion of the rack to relieve compression of said spring, a second pawl pivotally carried by the bracket and engaging the rack to prevent motion of the rack to increase compression of the spring, a tension spring connected to said pawls and resiliently holding them in engagement with the rack, and means secured to the first pawl for connection to a brake cylinder piston rod to move the said first pawl against the force of the resilient means to disengage the first pawl from the rack.

3. An automatic brake slack adjuster for a railway car brake system including a brake cylinder having a piston rod which comprises a rack having an end portion for connection to a brake lever to serve as a fulcrum for the system, a bracket to be rigidly fastened to the car and carrying the rack for endwise motion relative to the bracket, spring means engaging both the rack and bracket and resiliently urging movement of the rack to shift said fulcrum end portion relative to the bracket, a first pawl pivotally carried by the bracket and engaging the rack to prevent endwise motion of the rack in one direction relative to the bracket, a second pawl pivotally carried by the bracket and engaging the rack to prevent motion of the rack relative to the bracket in the other direction, means resiliently opposing disengagement of said pawls with the rack, means including a third pawl engaging the rack and a hand lever secured to the third pawl to move the rack against said spring means and thereby manually reset the slack adjuster, and means secured to the first pawl for connection to a brake cylinder piston rod to move the said first pawl against the force of the resilient means to disengage the first pawl from the rack.

4. In a railway car brake system including a brake cylinder having a piston rod and a brake rigging comprising a pair of brake levers connected to the piston rod for actuation thereby and brake rods connected to the brake levers, the combination of an automatic brake slack adjuster which functions also as the fulcrum of the system and operates to take up in a single bite all the slack in the system by moving the fulcrum relative to the brake cylinder when the piston rod is actuated to apply the brakes, said slack adjuster comprising a rack connected to one of said brake levers to provide the fulcrum point of the system, spring means resiliently urging movement of the rack to shift the system fulcrum in a direction to take up slack, a pawl rotatable about a fixed axis, engageable with the rack and serving to prevent movement of the rack in said direction, means including a piston rod bracket and a lever engageable with said bracket and connected to the said pawl to rotate and thereby disengage said pawl from the rack when the piston rod is actuated and slack in the system is to be taken up, and means engaging the rack to prevent movement of the rack in the opposite direction.

5. In a railway car brake system including a brake cylinder having a piston rod and a brake rigging comprising a pair of brake levers connected to the piston rod for actuation thereby and brake rods connected to the brake levers, the combination of an automatic brake slack adjuster which functions also as the fulcrum of the system and operates to take up in a single bite all the slack in the system by moving the fulcrum relative to the brake cylinder when the piston rod is actuated to apply the brakes, said slack adjuster comprising a rack connected to one of said brake levers to provide the fulcrum point of the system, spring means resiliently urging movement of the rack to shift the system fulcrum in a direction to take up slack, first and second pawls rotatable in opposite directions about fixed axes and engageable with the rack, said pawls serving, respectively, to prevent movement of the rack in a direction to take up slack and in the opposite direction, means including a bracket connected to the piston rod and a lever engageable with said bracket and connected to the first said pawl to rotate and thereby disengage said pawl from the rack when the piston rod is actuated and slack in the system is to be taken up, and means to rotate the said second pawl to disengage it from the rack when the adjuster is to be reset.

References Cited in the file of this patent

UNITED STATES PATENTS

| | | |
|---|---|---|
| 704,508 | Burgess | July 15, 1902 |
| 1,991,262 | Sauvage | Feb. 12, 1935 |
| 2,719,613 | Spann et al. | Oct. 4, 1955 |